(12) United States Patent
Liu et al.

(10) Patent No.: US 10,893,403 B2
(45) Date of Patent: *Jan. 12, 2021

(54) DEPLOYMENT OF PROXIMITY BEACON DRIVES

(71) Applicant: Extreme Networks, Inc., San Jose, CA (US)

(72) Inventors: Changming Liu, Cupertino, CA (US); Chris Scheers, Palo Alto, CA (US); Jingsong Fu, Palo Alto, CA (US); Haofeng Kou, San Ramon, CA (US); Arun K. Goel, Cupertino, CA (US); Matthew Stuart Gast, San Francisco, CA (US)

(73) Assignee: Extreme Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/174,258

(22) Filed: Oct. 29, 2018

(65) Prior Publication Data

US 2019/0069158 A1 Feb. 28, 2019

Related U.S. Application Data

(63) Continuation of application No. 14/281,124, filed on May 19, 2014, now Pat. No. 10,117,085.

(51) Int. Cl.
*H04W 8/00* (2009.01)
*H04W 4/021* (2018.01)
*H04W 84/12* (2009.01)
*H04W 72/04* (2009.01)
*H04W 4/80* (2018.01)
*H04L 29/06* (2006.01)
*H04W 84/20* (2009.01)

(52) U.S. Cl.
CPC .......... *H04W 8/005* (2013.01); *H04W 4/021* (2013.01); *H04W 4/80* (2018.02); *H04W 72/0473* (2013.01); *H04W 84/12* (2013.01); *H04L 69/08* (2013.01); *H04L 69/18* (2013.01); *H04W 84/20* (2013.01)

(58) Field of Classification Search
CPC ............................. H04W 8/005; H04W 4/80
See application file for complete search history.

(56) References Cited

U.S. PATENT DOCUMENTS

| | | | |
|---|---|---|---|
| 8,781,502 B1 | 7/2014 | Middleton | |
| 10,117,085 B2* | 10/2018 | Liu | .......................... H04W 4/80 |
| 2009/0058653 A1 | 3/2009 | Geissler | |
| 2014/0220883 A1 | 8/2014 | Emigh | |

(Continued)

*Primary Examiner* — Jason E Mattis
(74) *Attorney, Agent, or Firm* — Sterne, Kessler, Goldstein & Fox P.L.L.C.

(57) ABSTRACT

A technique for deploying proximity beacons involves coupling proximity beacon transmitters and/or hubs to an enterprise network device. The coupling can be by way of physically connecting communication interfaces of the network device and the proximity beacon transmitter or hub. In some implementations, the communication interface can be implemented as a USB interface. In some implementations, the communication interface can be embedded within the network device, such that the communication interface can provide the physical connection in the form of an embedded or internal connection.

19 Claims, 7 Drawing Sheets

(56) References Cited

U.S. PATENT DOCUMENTS

2015/0016305 A1\* 1/2015 Douer .................. H04W 48/16
   370/254
2015/0084769 A1 3/2015 Messier
2015/0289111 A1 10/2015 Ozkan
2016/0302060 A1\* 10/2016 Agardh .................. H04L 67/16

\* cited by examiner

DEPLOYMENT OF PROXIMITY BEACON DRIVES

CROSS-REFERENCE TO RELATED APPLICATIONS

This application is a continuation of U.S. patent application Ser. No. 14/281,124, filed May 19, 2014, all of which is incorporated by reference herein.

BACKGROUND

An area of ongoing research and development is in improving wireless communications. Many computing devices or systems utilize wireless communication technologies, such as Wi-Fi or Bluetooth. Such wireless technologies are used for a wide variety of purposes, such as for communicating and/or data sharing. Due to increased usage and reliance on such wireless technologies, it can be beneficial to develop improvements to wireless communications.

A specific area of wireless communication research and development is low power, short range wireless communication, such as Bluetooth® Low Energy (Bluetooth LE or BLE). In general, low power, short range wireless communication technologies provide communication capabilities within a limited range. An example of a relatively low power, short range communication technology is BLE. BLE is a wireless area network technology intended to provide significantly reduced power consumption and cost, while maintaining a communication range similar to those of previous versions of Bluetooth. In one example, devices capable of utilizing BLE technology, such as proximity beacons, can periodically advertise their presence; another device can detect the signals and thereby determine its proximity to the advertising BLE-capable devices.

The foregoing discussion of related art is intended to be illustrative and not exclusive. The problems or concerns associated with conventional approaches can create challenges for and reduce the overall experience associated with utilizing proximity beacons. Other limitations of the relevant art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not necessarily limiting in scope. In various embodiments, one or more of the above-described problems have been addressed, while other embodiments are directed to other improvements.

A technique for communicating with a proximity beacon transmitter, such as a Bluetooth® Low Energy (BLE) device, enables an enterprise to communicate data associated with the enterprise to proximity beacon receivers. The enterprise can take advantage of network devices that are deployed in a given area for the purpose of providing a wireless local area network (WLAN) or some other network. Because enterprises frequently have LANs, the deployment of proximity beacon transmitters in association with network devices has some synergistic advantages, as is discussed in more detail in this paper.

Management of network devices is a task frequently undertaken by an enterprise. Management of proximity beacon transmitters is a task that can be taken on by an enterprise, or delegated to another entity responsible for proximity beacon device management. Proximity beacon interpretation is a task that will likely be undertaken by proximity beacon receivers. However, providing the proximity beacon receiver devices the tools to interpret proximity beacons as the enterprise intends can be taken on by the enterprise or delegated to another entity responsible for providing an application and/or data sufficient to enable the proximity beacon receiver devices to interpret proximity beacon content. This other entity may or may not be the same as the entity responsible for proximity beacon device management.

These and other advantages will become apparent to those skilled in the relevant art upon a reading of the following descriptions and a study of the several examples of the drawings.

DETAILED DESCRIPTION

Figure 1:
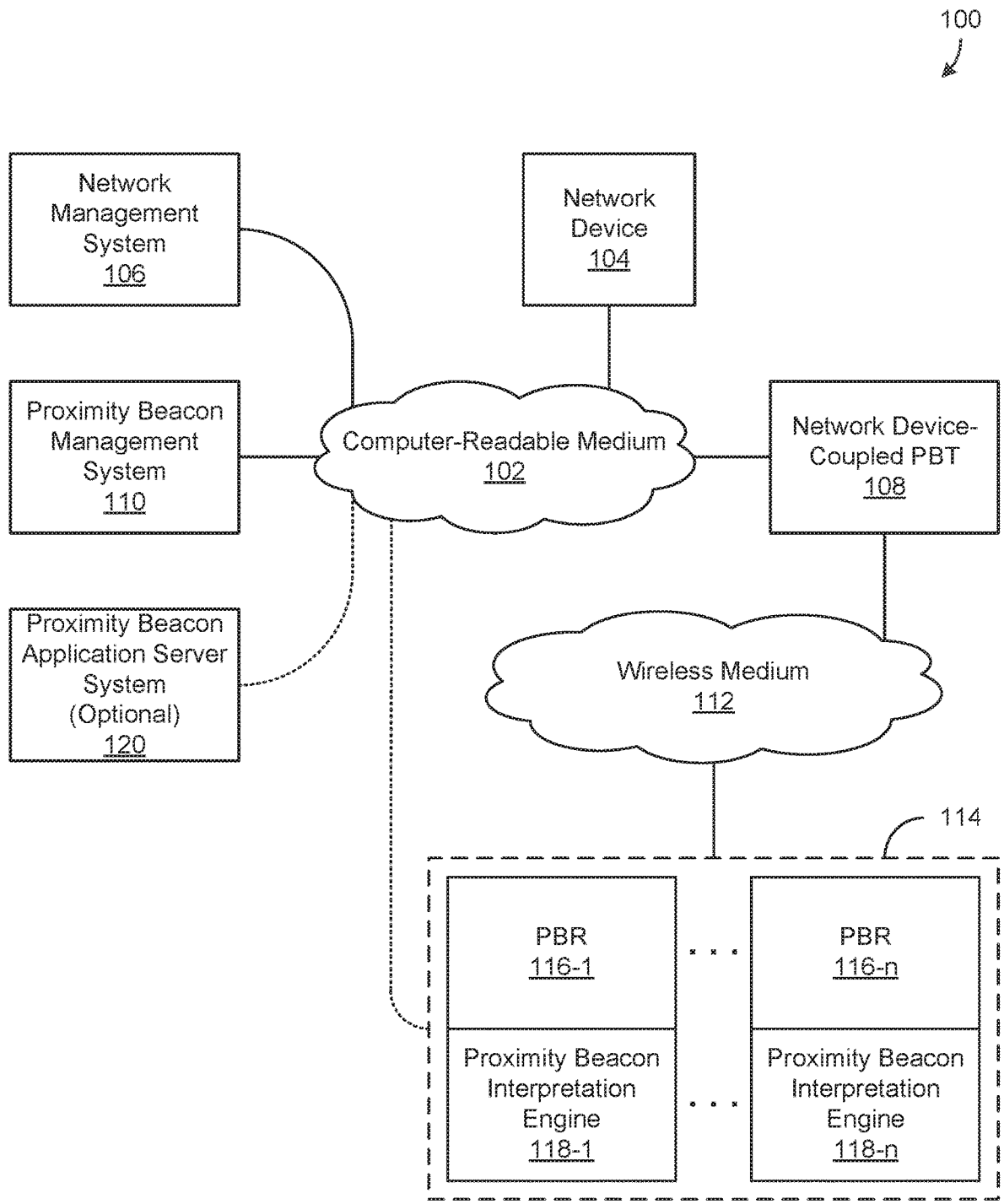
FIG. 1 depicts a diagram of an example of a network device-coupled proximity beacon system.

FIG. 1 depicts a diagram 100 of an example of a network device-coupled proximity beacon system. In the example of FIG. 1, the diagram 100 includes a computer-readable medium 102, a network device 104, a network management system 106, a network device-coupled proximity beacon transmitter (PBT) 108, and a proximity beacon management system 110. In operation, the network device-coupled PBT 108 transmits a proximity beacon signal (PBS) via a wireless medium 112 to a set of proximity beacon receiver (PBR) devices 114 within range, with the set of PBR devices 114 being represented as PBRs 116-1 to 116-n (collectively, PBRs 116) in the example of FIG. 1. For illustrative purposes, the PBRs 116 are coupled to respective proximity beacon interpretation engines 118-1 to 118-n (collectively, proximity beacon interpretation engines 118), though it should be understood it is possible to detect a proximity beacon without being able to interpret it. The system optionally includes a proximity beacon application server system 120 coupled to the proximity beacon interpretation engines 118 through the computer-readable medium 102, the coupling being represented as dotted lines in the diagram 100.

In the example of FIG. 1, the network device 104, network management system 106, network device-coupled PBT 108, and proximity beacon management system 110, and optionally the PBR devices 114 and proximity beacon application server system 120, are coupled to each other through the computer-readable medium 102. As used in this paper, a "computer-readable medium" is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 is intended to represent a variety of potentially applicable technologies. For example, the computer-readable medium 102 can be used to form a network or part of a network. Where two components are co-located on a device, the computer-readable medium 102 can include a bus or other data conduit or plane. Where a first component is co-located on one device and a second component is located on a different device, the computer-readable medium 102 can include a wireless or wired back-end network or local area network (LAN) or personal area network (PAN). The computer-readable medium 102 can also encompass a relevant portion of a wide area network (WAN) or other network, if applicable.

The computer-readable medium 102, the network device 104, network management system 106, network device-coupled PBT 108, proximity beacon management system 110, PBR devices 114, and proximity beacon application server system 120, and other applicable systems or devices described in this paper may or may not be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine or through multiple engines. As used in this paper, an engine includes at least two components: 1) a dedicated or shared processor and 2) hardware, firmware, and/or software executed by the processor. Depending upon implementation-specific or other considerations, an engine can be centralized or its functionality distributed. An engine can include special purpose hardware, firmware, or software embodied in a computer-readable medium for execution by the processor. The processor transforms data into new data using implemented data structures and methods, such as is described with reference to the FIGS. in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Referring once again to the example of FIG. 1, the network device 104 is coupled to the computer-readable medium 102. The term "network" can include a number of types of communications networks, such as the Internet, an infrastructure network, or the like. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, one or more other networks can include, for example, a wide area network (WAN), metropolitan area network (MAN), campus area network (CAN), local area network (LAN), personal area network (PAN), but the one or more other networks can at least theoretically be of any size or characterized in some other fashion (e.g., body area network (BAN), near-me area network (NAN), home area network (HAN), or Internet area network (IAN), to name a couple of alternatives).

Networks can include enterprise private networks and virtual private networks (collectively, "private networks"). As the name suggests, private networks are under the control of a single entity. Private networks can include a head office and optional regional offices (collectively, offices). Many offices enable remote users to connect to the private network offices via some other network, such as the Internet. One or more other networks, as described in this paper, may or may not include a private network(s). In specific implementations, networks can be implemented as a WAN, public switched telephone network (PSTN), cellular network, or some other network or combination of similar or different networks capable of coupling two private networks. For illustrative simplicity, the term "enterprise network" is intended to encompass any network or subnet under the control of a single party, regardless of whether the party would be referred to as a "home owner" or a "business."

While the network device 104 may be capable of functioning on a number of different networks, for illustrative utility in this paper, the network device 104 will at least be configured to operate on an enterprise network and can therefore be characterized as a network device of the relevant enterprise network. Depending upon requirements, preferences, or other factors the network device 104 can be implemented as an access point (AP), gateway, router, bridge, switch, or some other applicable network device on the enterprise network. In a specific implementation, the network device includes a wireless AP (WAP) that operates in accordance with proprietary or standardized protocols. A wireless network can refer to, by way of example but not limitation, to an infrastructure network, an ad hoc network, or some other applicable wireless network. Data on a wireless network is often encrypted, but can be sent in the clear if desired.

For illustrative purposes, examples of systems described in this paper are described in association with a subset of the IEEE 802 family of standards. IEEE 802.3 is a working group and a collection of IEEE standards produced by the working group defining the physical layer and data link layer's MAC of wired Ethernet. This is generally a LAN technology with some WAN applications. Physical connections are typically made between nodes (e.g., client devices, computing devices or systems) and/or infrastructure devices (e.g., hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In this paper, 802.11 standards terminology is used by way of relatively well-understood example to discuss enterprise network implementations that include wireless capabilities. For example, a client device or computing device, as used in this paper, may be referred to as a device with a media access control (MAC) address and a physical layer (PHY) interface to a wireless medium that complies with the IEEE 802.11 standard. Thus, for example, client devices and a network device (e.g., a wireless access point (WAP)) with which the client devices associate can be referred to as network devices, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a network device may comply with a different standard than Wi-Fi or IEEE 802.11, may be referred to as something other than a "network device," and may have different interfaces to a wireless or other medium.

Referring once again to the example of FIG. 1, the network management system 106 is coupled to the network device 104 through the computer-readable medium 102. The network management system 106 is configured to manage at least the network device 104, and is expected to manage a plurality of network devices in operation, to facilitate communications with or between network devices, and/or to process data transmitted to and received from network devices. The network management system 106 can be implemented as a cloud-enabled service (e.g. a globally distributed, cloud-based infrastructure), as a centralized server, distributed across network devices (such as by way of example but not limitation, the network device 104). In a specific implementation, the network management system 106 enables the use of an online network management solution, client management, and ID management for guests, with network as a service (NaaS) subscription model.

In the example of FIG. 1, the network device-coupled PBT 108 is coupled to the network device 104 through the computer-readable medium 102. In a specific implementation, the network device-coupled PBT 108 is coupled to the network device 104 via a universal serial bus (USB) port connection. In such an implementation, the network device-coupled PBT can be implemented on a USB device or component, such as a USB dongle, a USB stick, a USB drive, or the like. As such, the USB port can enable an operational connection between the network device-coupled PBT 108 and the network device 104 by plugging the network device-coupled PBT 108, or a component thereof, into the USB port of the network device 104. In a specific implementation, the network device 104 can also supply power to the network device-coupled PBT 108 via the USB connection.

As used in this paper, Universal Serial Bus (USB) can refer to an industry standard that defines the cables, connectors, and communications protocols used in a bus for connection, communication, and power supply between various devices and/or components. It is contemplated that the USB connection between communication interfaces and network devices can be associated with various versions of USB, such as USB Version 1, USB Version 2, or USB Version 3. In one example, when a USB device is connected to a USB host, a USB device enumeration process can be initiated. The enumeration process can start by transmitting a reset signal to the USB device. In this example, a data rate of the USB device can be determined during the transmission of the reset signal. Subsequent to the transmission of the reset signal, information associated with the USB device can be read or analyzed by the connected USB host and the USB device can be assigned an address. In some cases, the address can correspond to a unique 7-bit address. If it is determined that the USB device is supported by the USB host, then various drivers for communicating with the USB device can be loaded and the USB device can be set to a configured state. In some cases, if the USB host is restarted, then the enumeration process can be repeated for the connected USB device (as well as for other USB devices connected to the USB host). In some cases, it can be advantageous to implement a communication interface in a USB device because the USB device can be portable and because many network devices already possess USB ports. Accordingly, additional functionality provided by the communication interface can be made available to network devices in a convenient and cost-effective manner.

Port connections other than USB could also be used, such as by way of example but not limitation, FireWire, Ethernet, musical instrument digital interface (MIDI), eSATA/eSTATp, or Thunderbolt. In an alternative, the network device-coupled PBT 108 can be implemented onto a memory device or as a printed circuit board (PCB) or other fixed, slotted/removable, embedded or external hardware component that could be considered part of or incorporated into the network device 104. In some implementations, a network device 104 can share resources, such as memory and processing power, with an appropriately coupled network device-coupled PBT 108. In some cases, the network device 104 can share power with the embedded network device-coupled PBT 108. For example, the network device 104 can utilize an external power supply to receive power as required for operation, and the received power can also be shared with or provided to the network device's embedded communication interface.

In a specific implementation, the network device-coupled PBT 108 transmits signals periodically. For example, the network device-coupled PBT 108 could broadcast a signal including information associated with the proximity beacon device (e.g., UUID, major value, minor value, etc.) 10 times per second. In a system that includes multiple proximity beacons (not shown), the multiple proximity beacon devices can transmit signals that may be unique with respect to each other. The ability to hear the signals, therefore, can at least be indicative of the presence of the relevant proximity beacon device. The one or more signals can be characterized as advertising signals because they advertise the presence of the relevant proximity beacon device. The one or more signals can also be characterized as a data packet (singular) because even if the relevant data packet is broken into multiple signals, the data packet can be assembled therefrom. In an implementation in which the data packet includes a small amount of data (such as a UUID), the data packet can have a small size and thus can have relatively low power consumption requirements. If implemented appropriately, it should not consume significant resources to advertise proximity beacon device location.

In a specific implementation, identifiers can include multiple distinct values, such as UUID, major, and minor. For example, an iBEACON™ (an Apple Inc. trademark) includes a 128-bit UUID, a 16-bit major, and 16-bit minor. In an example intended to illustrate how iBeacons (or other proximity beacons) can be used, the UUID can represent an organization, a corporation, an entity, a franchise, a manufacturer, or a brand. For example, all retail stores within a franchise chain can have the same UUID. Continuing the example, the major value can be used to indicate a particular store within a franchise, a particular store section, a particular department, specified premises, or a specified geolocational area (e.g., a floor/level within a building) with which the proximity beacon is associated. Continuing the example, the minor value can be used to identify different offerings (e.g., products, services, etc. within a given location), subsections, sub-departments, or subareas (within a particular store, store section, department, premises, or geolocational area).

Depending upon the implementation, in addition to identifier(s), proximity beacon signals can include data such as by way of example but not limitation, flags (e.g., alerts, notifications), power levels (e.g., transmission power levels), local names (e.g., nicknames for beacons), services (e.g., services provided by beacons), or the like.

The network device-coupled PBT 108 can also be coupled to the network device 104 via a wireless communications interface, which can be treated as part of the network device-coupled PBT 108 (not shown) and the network device 106 would likely have an applicable wireless communications interface (not shown).

Advantageously, because the network device-coupled PBT 108 is coupled to the network device 104, certain management functions become easier to implement. Such functions can include presence (useful for determining that the network device-coupled PBT 108 has not been moved, powered-down, run out of battery power, or the like), location awareness (useful for micromapping), suitability (because the positioning of network devices within a service area is frequently done in a manner that puts the network devices near remote stations), security (because the network devices are frequently in relatively safe locations, such as the ceiling or high on a wall), power control (useful for providing power to proximity beacons in a scalable manner), secure management (useful for preventing unauthorized modifications to proximity beacons in a scalable manner), and remote management (useful for managing a large number of proximity beacons in a scalable manner).

In the example of FIG. 1, the proximity beacon management system 110 is coupled to the network device-coupled PBT 108 through the computer-readable medium 102. Depending upon the implementation, the proximity beacon management system 110 can be relatively remote or separate from the network device-coupled PBT 108. For example, the proximity beacon management system 110 can be implemented in the cloud (such as in the form of a cloud service), on an enterprise WAN, or some other applicable location not on the network device-coupled PBT 108. In an alternative implementation, the proximity beacon management system 110 can be implemented, in part or in whole, on the network device-coupled PBT 108 (e.g. in a distributed fashion or by maintaining localized datastores). In a specific implementation, regardless of where the proximity beacon management system 110 runs, an administrator of the network device-coupled PBT 108 has a single point of management for a proximity beacon network that includes the network device-coupled PBT 108. For example, rather can managing multiple proximity beacons separately (e.g., connecting to and configuring one proximity beacon at a time), the proximity beacon management system 110 can allow for management of multiple proximity beacons at once. In a more specific example, a new store for XYZ Inc. has just opened and multiple proximity beacon devices have been deployed throughout the store. All of the proximity beacon devices can be configured with a single control signal to advertise the UUID associated with XYZ Inc. All of the proximity beacon devices can be configured with the same control signal (or a second single control signal) to advertise the major associated with the store location. All of the proximity beacon devices can also be configured with the same control signal (or a second or third single control signal; or multiple individual signals transmitted in response to a single command) to advertise the minor associated with their location. Advantageously, the proximity beacon devices know their location because they are, in accordance with the example of FIG. 1, network device-coupled. The minor could even be a function of the service set identifier (SSID) or MAC address of its associated WAP (for the minor to have the same value as the SSID or MAC address, the minor must have the same number of bits as a SSID or MAC address, which may or may not be the case for a given implementation).

In a specific implementation, the proximity beacon management system 110 automatically assigns UUID, major, and minor when a network device-coupled PBT 108 is first coupled to the network device 104. (In this example, it is assumed any previous assignment of UUID, major, and minor are overwritten.) The network device 104 is assigned a UUID, which in this example is the same as all other network devices of the enterprise WAN. When the network device-coupled PBT 108 is coupled to the network device 104, the proximity beacon management system 110 configures the network device-coupled PBT 108 with the UUID assigned to the network device 104. The network device 104 is also assigned a major, which in this example is the same as all other network devices on an enterprise WLAN, which could be characterized as an extended service set (ESS), but is intended to mean the WLAN of a specific location because the actual location is important for the purpose of micromapping. When the network device-coupled PBT 108 is coupled to the network device 104, the proximity beacon management system 110 configures the network device-coupled PBT 108 with the major assigned to the network device 104. The network device 104 is also assigned a minor, which in this example is at least unique with respect to other network devices of the WLAN. Accordingly, the UUID, major, and minor act as a unique identifier for the network device 104. When the network device-coupled PBT 108 is coupled to the network device 104, the proximity beacon management system 110 configures the network device-coupled PBT 108 with the minor assigned to the network device 104.

In a specific implementation, communication between the proximity beacon management system 110 and the network device-coupled PBT 108 is through the network device 104. For example, the network device 104 can include an Ethernet port that operationally connects the network device 104 to an enterprise LAN. In such an implementation, the network device 104 can receive data from the proximity beacon management system 110 on the Ethernet port and forward the data to the network device-coupled PBT 108, and receive data from the network device-coupled PBT 108 and forward the data to the proximity beacon management system 110. Alternatively, the proximity beacon management system 110 can communicate with the network device-coupled PBT 108 over some other medium, such as a cellular network.

In a specific implementation, the network management system 106 and the proximity beacon management system 110 are administered by an agent of the same enterprise. However, this is not a requirement; the network management system 106 can be administered by a first enterprise and the proximity beacon management system 110 can be administered by a second enterprise. Where two entities are involved, it is expected the network device 104 will be managed by the network management system 106, both of which are administered by an agent of a first enterprise responsible for maintaining a network (such as a LAN and/or a WLAN), and the network device-coupled PBT 108 will be managed by the proximity beacon management system 110, both of which are administered by an agent of a second enterprise responsible for maintaining proximity beacons. In an alternative, the first enterprise and second enterprise can instead by distinct divisions (of an applicable type) within a single enterprise.

In a specific implementation, the proximity beacon management system 110 is responsible for sending control signals to the network device-coupled PBT 108 for the purpose of adjusting configurable features, such as transmission power, transmission rate, enter/exit power-save (sleep, wake-up, hibernate, stand-by, etc.), UUID (or other identifier) changes, and/or other features that can be changed via control signals. For example, the proximity beacon management system 110 can instruct the network device-coupled PBT 108 to reduce transmission power levels or to stop broadcasts at specified times (e.g., after business hours) and to increase transmission power levels or to resume broadcasts at specified times (e.g., during business hours). The control signals can be encrypted to prevent unauthorized changes to the network device-coupled PBT 108.

In a specific implementation, the proximity beacon management system 110 is responsible for receiving feedback from the network device-coupled PBT 108 for the purpose of determining presence (e.g., on start-up or occasionally with a "ping" or report), power consumption, battery life, proximity beacon inventory, geolocation data (e.g., relative location and/or proximity to other beacons/devices based on signal strength and/or transmission power level, movement of beacons, etc.), diagnostics, or other data deemed useful for providing information about a proximity beacon device or proximity beacon network. In appropriate circumstances, such as if the proximity beacon management system 110 determines a proximity beacon device has lost presence (e.g., because it failed, lost power, was moved, etc.), the proximity beacon management system 110 can notify an appropriate human or artificial agent (e.g., to alert an administrator that a new battery should be installed, to alert security personnel that theft of an object to which the proximity beacon is attached may be in progress, etc.) and/or initiate a response (e.g., attempt to reestablish contact for a period of time before escalation, listen for the proximity beacon using appropriately configured network devices).

In a specific implementation, the proximity beacon management system 110 is subsumed by the network management system 106, and the two can be referred to in the aggregate as a "network management system."

In the example of FIG. 1, the wireless medium 112 is intended to represent airspace associated with transmissions of the network device-coupled PBT 108. In a specific implementation, the wireless medium 112 is associated with a low power wireless communications protocol. Some low power wireless communications protocols may be compliant with standards, protocols, and/or specifications such as Bluetooth Core Specification Version 4.0, ZigBee, Z-Wave, active Radio-Frequency Identification (RFID), or the like. A communications protocol based on Bluetooth Core Specification Version 4.0 can include, but is not limited to Bluetooth Low Energy (Bluetooth LE or BLE), which may also be referred to as Bluetooth SMART. Bluetooth low energy is a wireless personal area network (PAN) technology intended to enable communications with reduced power consumption and cost while maintaining a suitable communication range, similar to ranges provided by previous Bluetooth technologies (e.g., Bluetooth Version 3, Bluetooth Version 2, Bluetooth Version 1).

In the example of FIG. 1, the PBR devices 114 are coupled to the network device-coupled PBT 108 through the wireless medium 112. In a specific implementation, the PBR devices 114 are receivers of the network device-coupled PBT 108 transmissions. In an alternative, the PBR devices 114 can be implemented as clients of the network device-coupled PBT 108. In another alternative, the PBR devices 114 can be implemented as clients of the network device 104 (e.g. on a Wi-Fi network), in addition to acting as receivers or clients of the network device-coupled PBT 108 transmissions (e.g. BLE transmissions).

In the example of FIG. 1, the PBR devices 114 include at least PBRs 116, which are components responsible for receiving transmissions from the network device-coupled PBT 108. As used in this paper, a receiver is intended to mean a device capable of receiving electromagnetic or mechanical waves over an interface and converting the electromagnetic or mechanical waves into a usable form. In an electromagnetic receiver implementation, an antenna of the receiver intercepts electromagnetic radiation and converts it into tiny alternating currents which are applied to the receiver, and the receiver extracts the desired information. In a radio frequency implementation, the receiver uses electronic filters to separate a desired radio frequency signal from all the other signals picked up by the antenna, an electronic amplifier to increase the power of the signal for further processing, and recovers the desired information through demodulation.

The information produced by the receiver may be in the form of sound (an audio signal), images (a video signal) or data (a digital signal). However, in a specific implementation, the data provided by the network device-coupled PBT 108 is a narrow subset of the information that can be transmitted, such as a unique identifier (UID), a universally unique identifier (UUID), or some other applicable identifier that is useful for micromapping; so the information produced by the receiver is limited. A UID can refer to an identifier that is unique among all identifiers within a specified scope and/or purpose. A UUID can refer to an identifier that uniquely identifies an object without significant central coordination. However, since each UUID has a finite size, it is possible for two differing objects to share the same UUID, thereby creating a conflicting UUID. Nonetheless, it is contemplated that the UUID identifier size and generation process can be selected so as to make the potential occurrence of conflicting UUIDs sufficiently improbable in practice. A UUID can be created and used to identify an object with reasonable confidence that the same UUID will never be unintentionally created to identify another object.

What the PBR devices 114 do with the transmission from the network device-coupled PBT 108 is implementation-, environment-, device-, and/or configuration-specific. For example, if the network device-coupled PBT 108 transmits a UUID, major, and minor, the PBR devices 114 may or may not know what is intended by the values. If the PBR devices 114 are also clients of a WLAN, the PBR devices 114 can receive, e.g., micromapping services from the WLAN (e.g., through the network device 104 if it is capable of acting as a WAP), which facilitate interpretation of the received proximity beacon values. Another possibility is providing the PBR devices 114 to people who will use them within a given location, where the PBR devices 114 know how to interpret the data provided by the network device-coupled PBT 108. One relatively flexible technique for providing micromapping or other applicable services to a person is to take advantage of the fact that many individuals will carry mobile devices on which applications ("apps") can be installed and which are also capable of detecting proximity beacons. For example, smart phones with this capability are quite common.

In the example of FIG. 1, the PBRs 116 are coupled to the proximity beacon interpretation engines 118. The proximity beacon interpretation engines 118 can be implemented as software installed on a mobile device. The proximity beacon interpretation engines 118 can be configured to convert the data received from the network device-coupled PBT 108 into information useful to a user of the mobile device. For example, the network device-coupled PBT 108 can advertise its presence with PAN signals; the PBR 116-1 can receive the PAN signals and convert them to UUID, major, and minor; and the proximity beacon interpretation engine 118-1 can interpret the UUID to mean "XYZ Inc.," the major to mean "XYZ outlet at 123 Main Street," and the minor to mean "Shoe Department."

It is expected there will be some desire on the part of mobile device owners to conserve power on their mobile devices. So it may be the case the device does not attempt to discern the entire meaning of a proximity beacon at once. For example, the proximity beacon application engine 118-1 might first determine the UUID corresponds to XYZ Inc. If there is no desire on the part of the user of the mobile device to further explore the relevant location, the proximity beacon application engine 118-1 might not be tasked with figuring out what the major and minor values mean. Indeed, figuring out the meaning of the major and minor values may or may not entail downloading additional data to the mobile device. Of course, where an app is tied to a specific UUID (or can learn specific UUIDs), the relevant data may be locally available on the mobile device without a download.

In some implementations, geolocation information (e.g., relative location, proximity) can be determined based on various factors, including network connectivity, Global Positional System (GPS), and/or social networking data, etc. In a specific implementation in which the network device-coupled PBT 108 is physically connected to the network device 104, if the network device 104 can hear a station, the station's location can be estimated to be close in proximity to the network device coupled PBT 108. This data, which can include a received signal strength indicator (RSSI), can be used alone or in conjunction with proximity beacons to aid in navigation, decrease the likelihood of a proximity beacon with a similar value as that of the network device-coupled PBT 108 will be misconstrued to be that of the enterprise network (e.g. if a neighbor innocently or intentionally spoofs the proximity beacon), or in other instances where a more precise location (proximity beacon) can be used in conjunction with a less precise, but longer range, Wi-Fi network device.

In another example, a GPS of a mobile device can assist in determining the mobile device's location, in conjunction with a proximity beacon.

In another example, social networking data or social media data can include information about where a mobile device has "checked-in" or was tagged, and can thus assist in determining the mobile device's location.

In another example, based upon a received proximity beacon signal (e.g. RSSI, transmission power level, or other characteristics), a mobile device can determine its location and/or proximity to the broadcasting proximity beacon. This approach can be used in conjunction with a proximity beacon interpretation engine, which interprets proximity beacon content, to provide data from both the proximity beacon content and characteristics of the proximity beacon signal itself.

These and other similar factors and approaches can be used, alone or in applicable combination, to determine geolocation information associated with a mobile device. In some implementations, the term "location" can generally refer to a place, position, or area, etc. In some instances, location can include an exact position or definite place, such as a GPS coordinate or a street address. In some instances, location can include a relative location. In one example, a first object's location can be "left of" a second object. In another example, the first object's location can be "one foot away from" the second object. In a further example, the first object's location can be "near" the second object. Accordingly, location can include proximity, but is generally a broader concept.

In the example of FIG. 1, the optional proximity beacon application server system 120 is coupled to the PBR devices 114 through the computer-readable medium 102. In some implementations, the proximity beacon application server 120 can be configured to communicate with the network management system 106, the proximity beacon management system 110, and/or some other device. The proximity beacon application server 120 may or may not be under the control of the same entity as the network management system 106 and/or the proximity beacon management system 110.

The purpose of the proximity beacon application server system 120 is to provide data sufficient for the proximity beacon interpretation engines 118 to determine the (probable) intended meaning of a detected proximity beacon. In a specific implementation, the proximity beacon application server 120 uploads software to a set of PBR devices 114, or to an intermediary or chain of intermediaries, eventually leading to the set of PBR devices 114 downloading the software. Because it is assumed the PBR devices 114 include hardware sufficient to make use of the software, the PBRs 116 can be coupled to an engine, such as the proximity beacon interpretation engines 118.

The proximity beacon application server system 120 can provide an app to the set of PBR devices 114, which the set of PBR devices 114 can then implement as an engine to interpret proximity beacons. The proximity beacon application server system 120 can also include a data server (not shown) capable of providing data specific to particular proximity beacon identifiers, whether before or after the applicable proximity beacon identifier is received. (The data specific to particular proximity beacon identifiers can also be provided when, e.g., the app is downloaded.) In order to obtain the data specific to particular proximity beacon identifiers with a mobile device that does not have a physical connection to an applicable network, such as the Internet, the mobile device may need to have a wireless connection that couples the mobile device to the proximity beacon application server system 120. The wireless connection can be, for example, a cellular connection, or the wireless connection could be a Wi-Fi connection through a WAP, which may or may not be a network device of the enterprise network to which the relevant network device-coupled PBT 108 is coupled, such as the network device 104. Thus, as an alternative not shown in the example of FIG. 1, the dotted line representing the link between the proximity beacon application server system 120 and the PBR devices 114 could pass from the PBR devices 114 through the computer-readable medium 102 (e.g., a portion of the computer-readable medium 102 implemented as a WLAN) to the network device 104 and from the network device 104 through the computer-readable medium 102 (e.g., a portion of the computer-readable medium 102 implemented as a LAN) to the proximity beacon application server system 120.

In a specific implementation, the optional proximity beacon application server system 120 provides an app to the PBR devices 114 (implemented as the proximity beacon interpretation engines 118). The PBR devices 114 may or may not initially be provided with all data associated with a proximity beacon. For example, the proximity beacon application server system 120 could provide the PBR devices 114 with data sufficient to enable the proximity beacon interpretation engines 118 to determine they have heard a proximity beacon, but the proximity beacon interpretation engine 118 may or may not be able to interpret the proximity beacon without first requesting from the proximity beacon application server system 120 (and perhaps, specifically, from an applicable data server) data sufficient to enable interpretation of the proximity beacon.

In a specific implementation, the data sufficient to enable interpretation of the proximity beacon is received in stages. For example, one of the proximity beacon interpretation engines 118 may hear a proximity beacon and request data associated with a first part (e.g. a UUID) that the relevant one of the proximity beacon interpretation engines 118 can detect but not interpret. If a user of a relevant one of the PBR devices 114 indicates interest, the relevant one of the proximity beacon interpretation engines 118 can request data associated with a second part (e.g. a major). If the user of the relevant one of the PBR devices 114 indicates interest, the relevant one of the proximity beacon interpretation engines 118 can request data associated with a third part (e.g. a minor). Of course, the major and minor data can be provided at once upon request or could be streamed in order of most utility (e.g. data associated with neighboring proximity beacon devices can be provided before data associated with more distant proximity beacon devices).

In a specific implementation, the proximity beacon application server system 120 provides the PBR devices 114 with information related to the network device-coupled PBT 108. If, for example, the network device-coupled PBT 108 is attached to a retail product, then the proximity beacon application server system 120 can provide the PBR devices 114 with product information, commercial advertisements, or promotions related to the retail product, when the PBR devices 114 are recognized to be close in proximity to the network device-coupled PBT 108.

Figure 2:
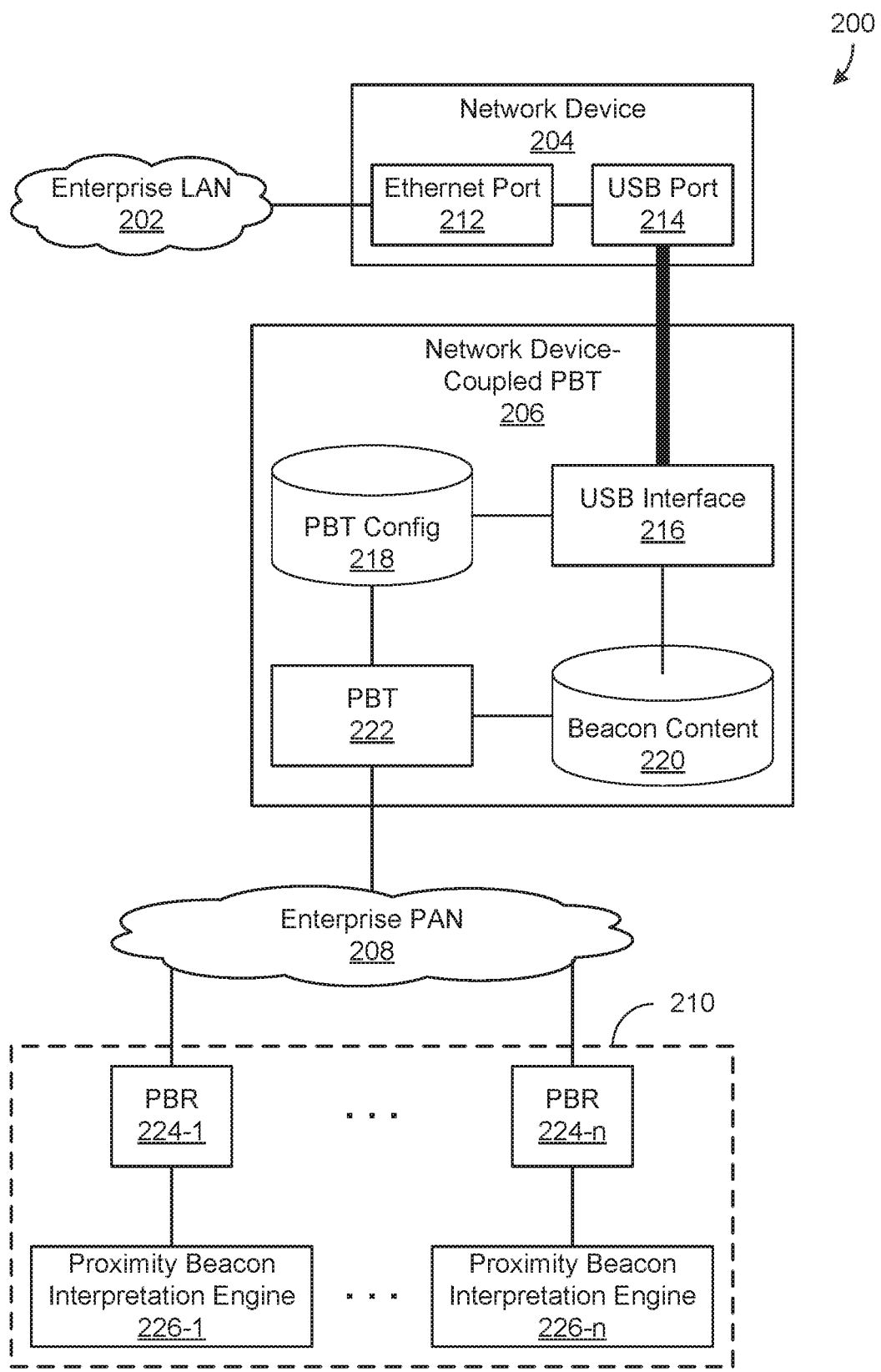
FIG. 2 depicts a diagram of an example of a system in which a proximity beacon transmitter (PBT) is operationally connected to a network device.

FIG. 2 depicts a diagram 200 of an example of a system in which a PBT is operationally connected to a network device. The diagram 200 includes an enterprise LAN 202, a network device 204, a network device-coupled PBT 206, an enterprise PAN 208, and PBR devices 210.

In the example of FIG. 2, the enterprise LAN 202 is intended to represent a network under the control of an entity (hereinafter, "the enterprise"). The enterprise LAN 202 can include a wired subnet, such as an IEEE 802.3-compatible network, a wireless subnet, such as an IEEE 802.11-compatible network, or a combination thereof. The enterprise LAN 202 can be part of a larger network, such as an enterprise WAN (not shown).

In the example of FIG. 2, the network device 204 includes an Ethernet port 212 and a USB port 214. The Ethernet port 212 is coupled to the enterprise LAN 202, which enables communication between the network device 204, the enterprise LAN 202, and, assuming the communication is allowed, an applicable other network to which the enterprise LAN 202 is coupled. The USB port 214 facilitates operationally connecting another device to the network device 204. Because network devices are often intentionally placed, the USB connection itself can serve to help determine the location of a connected device. The network device 204 can include other ports or interfaces, such as a wireless network interface, that enable the network device 204 to function as a router, access point, gateway, or the like, for a set of devices (not shown). In an alternative implementation, the Ethernet port 212 can be replaced with some other applicable communications interface for operationally connecting the network device 204 to the enterprise LAN 202, potentially including a wireless communications interface in an alternative in which the network device 204 is wirelessly connected to the enterprise LAN 202. In an alternative implementation, the USB port 214 can be replaced with some other applicable communications interface for operationally connecting the network device 204 to the network device-coupled PBT 206.

In the example of FIG. 2, the network device-coupled PBT 206 includes a USB interface 216, a PBT configuration datastore 218, a beacon content datastore 220, and a PBT 222. The network device-coupled PBT 206 is operationally connected to the network device 204 via the USB port 214 of the network device 204 and the USB interface 216 of the network device-coupled PBT 206. In an alternative implementation, the USB interface 216 can be replaced with some other applicable communications interface for operationally connecting the network device-coupled PBT 206 to the network device 204.

The PBT configuration datastore 218 is intended to represent parameters associated with the operation of the PBT. For example, the parameters can include transmit power, transmit frequency, and the like. A parameter can be provided from the network device 204 via the USB port 214 and the USB interface 216. A parameter may or may not initially be provided from a device other than the network device 204 on the enterprise LAN 202 via the Ethernet port 212 of the network device 204. A parameter can also be provided to the PBT configuration datastore 218 prior to coupling the network device-coupled PBT 206 to the network device 204 (e.g., in the factory, at retail, or at some other time prior to installation).

The beacon content 220 is intended to represent primary beacon values associated with transmissions from the PBT 222 and/or repeaters or intermediate nodes between the PBT 222 and PBR devices 210. For example, the primary beacon values can include a UUID, major, and minor value for transmission by the PBT 222. Secondary beacon values can be associated with battery life or other value determined to be useful for transmission, but not necessary for the purpose of beaconing a location. Secondary beacon values can be considered to be part of the PBT configuration datastore 218, the beacon content datastore 220, some other datastore, or a combination thereof.

In a specific implementation, the primary beacon values stored in the beacon content datastore 220 are determined prior to deployment as default values. The default values can be set at the time of manufacture, purchase, or by an admin prior to coupling the network-device coupled PBT 206 to the network device 204. Instead or in addition, one or more of the primary beacon values can be modified as part of an initialization process when the network device-coupled PBT 206 is coupled to the enterprise network 202 and/or the network device 204 or as an update in response to some stimulus, such as an administrator determining the primary beacon values should be changed and pushing the modification to the network device-coupled PBT 206 from a proximity beacon management system (see, e.g., FIG. 1, the proximity beacon management system 110), which may be implemented on the network device 204 or some other device coupled to the enterprise LAN 202 and/or through an interface on the network device-coupled PBT 206. The initialization or update of the primary beacon values can be accomplished manually or via an automated process, such as by pushing primary beacon values from the network device 204 (which in this example would include a beacon content datastore that exists for at least a short time) when the coupling of the network device-coupled PBT 206 is detected and recognized.

The PBT 222 is intended to represent a transmitter that beacons primary beacon values from the beacon content datastore 220 in accordance with applicable PBT configuration parameters from the PBT configuration datastore 218.

In the example of FIG. 2, the enterprise PAN 208 is intended to represent the transmission of proximity beacons from the network device-coupled PBT 206 into an airspace.

In the example of FIG. 2, the PBR devices 210 include PBRs 224-1 to 224-n (collectively, PBRs 224) and proximity beacon interpretation engines 226-1 to 226-n (collectively proximity beacon interpretation engines 226). The PBRs 224 are coupled to the enterprise PAN 208. The "coupling" is intended to include the PBRs 224 detecting wireless signals (specifically, proximity beacons) transmitted by the PBT 222. The respective proximity beacon interpretation engines 226 provide a meaning to the detected beacon values, which is likely to vary in accordance with the enterprise responsible for beaconing. (For example, one enterprise UUID might be an identifier of the enterprise that would only be decipherable as such if the relevant proximity beacon interpretation engine were capable of correlating the UUID with the enterprise; major and minor values, if any, could be even more enterprise-specific, such as by identifying a store, a department, a floor, a desk, a bathroom, etc.) Although some other physical allocation is possible, for the purposes of this paper, it is assumed applicable engines used to detect a wireless signal (e.g., an antenna array), convert the wireless signal to useful (usually, in modern times, digital) data, is treated as part of the PBRs 224, whereas applicable engines used to interpret the data is treated as part of the proximity beacon interpretation engines 226.

Figure 3:
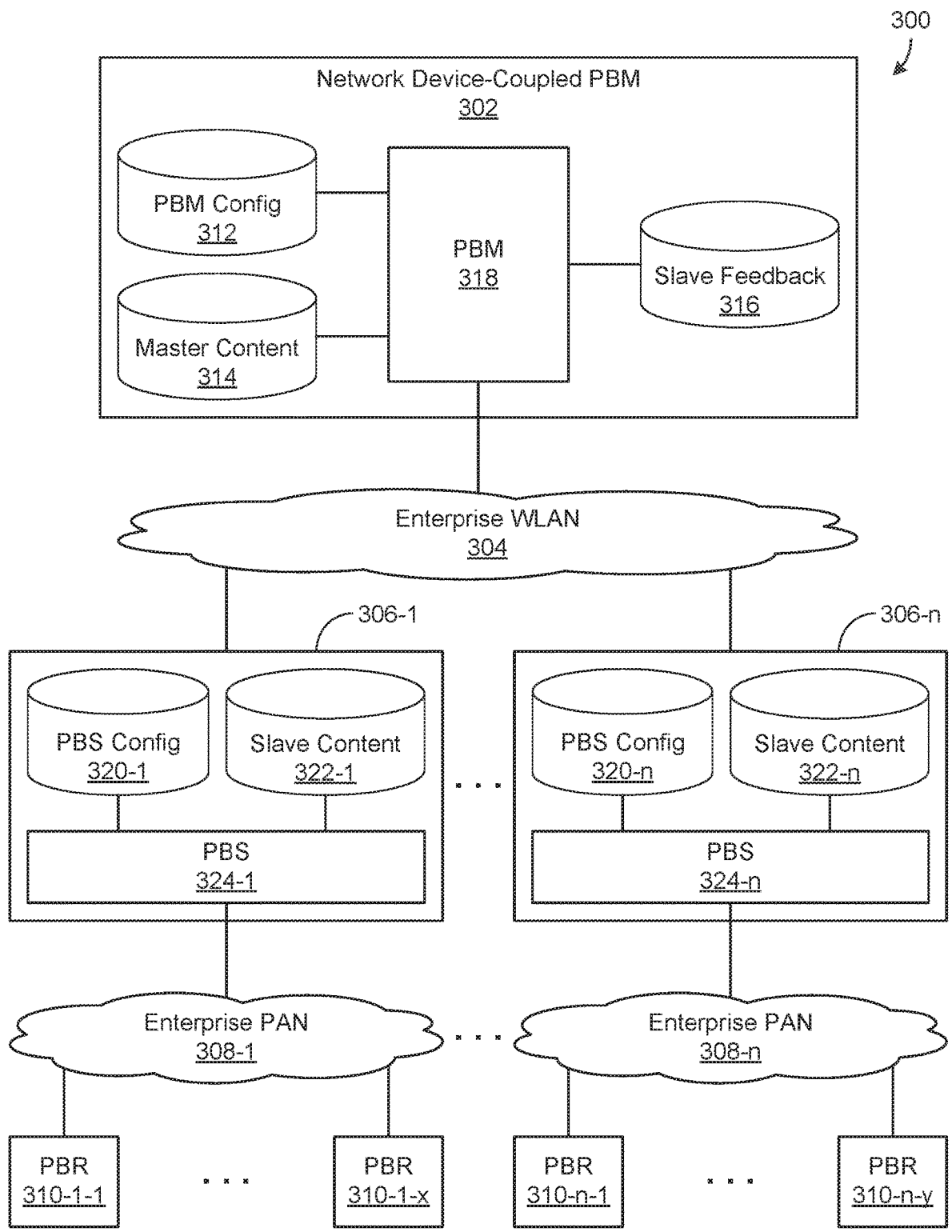
FIG. 3 depicts a diagram of an example of a system in which a proximity beacon master (PBM) is operationally connected to a network device.

FIG. 3 depicts a diagram 300 of an example of a system in which a proximity beacon master (PBM) is operationally connected to a network device. The diagram 300 includes a network device-coupled PBM 302, an enterprise WLAN 304, enterprise WLAN-coupled proximity beacon slave (PBS) 306-1 to enterprise WLAN-coupled PBS 306-n (collectively, enterprise WLAN-coupled PBSs 306), enterprise PAN 308-1 to enterprise PAN 308-n (collectively, enterprise PANs 308), and PBR 310-1-1 to PBR 310-1-x (collectively, PBRs 310-1) to PBR-n–1 to PBR-n-y (collectively, PBRs 310-n). A network device to which the network device-coupled PBM 302 is coupled (as well as a network to which the network device is coupled) has been omitted due to space limitations.

In the example of FIG. 3, the network device-coupled PBM 302 includes a PBM configuration datastore 312, a master content datastore 314, a PBM 318, and a slave feedback datastore 318. In a specific implementation, the network device-coupled PBM 302 is operationally connected to a network device (see, e.g., FIG. 1, network device 104 or FIG. 2, network device 204); the network device may or may not in turn be operationally connected to an enterprise LAN (see, e.g., FIG. 2, enterprise LAN 202).

The PBM configuration datastore 312 is intended to represent parameters of operation of the PBM 318. The parameters of operation can be similar to those described with reference to the PBT configuration datastore 218 (FIG. 2). For illustrative reasons, the PBM 318 will at least transmit data useful for PBSs. However, in a specific implementation, the PBM 318 may or may not also transmit proximity beacons useful for PBRs. In such an implementation, the parameters of operation can include parameters associated with both the proximity beacons for consumption by PBRs and control frames or partial proximity beacons for consumption by PBSs.

The master content datastore 314 is intended to represent content of the control frames or partial proximity beacons (or proximity beacons, if applicable) for transmission by the PBM 318. Control frames can include an instruction to a PBS regarding the operation of the PBS. Partial proximity beacons can include a subset of beacon content a PBS may in turn transmit as part of a proximity beacon. It may be noted, in this case, the subset of beacon content can include the entirety of the beacon content later transmitted by the PBS, but a "partial proximity beacon" is still intended to mean a proximity beacon that is not necessarily useable (at least not in its entirety) as a proximity beacon by a PBR. If a transmission from the PBM is referred to as a proximity beacon, that is intended to mean a PBR can use the proximity beacon as such, regardless of whether the PBS also makes use of the proximity beacon (either when acting as a repeater or when storing, ignoring, and/or acting on data associated with the proximity beacon).

The slave feedback datastore 316 is intended to represent data gathered from monitoring PBSs, either through receipt of explicit feedback from PBSs to the PBM 318 or to some other network device, or from monitoring at the PBM 318 or some other receiver transmissions of PBSs, e.g., to PBRs. The feedback of the slave feedback datastore 316 can be sent to the network device to which the network device-coupled PBM 302 is operationally connected, to some other network device, or processed by a local feedback processing engine (not shown). Slave feedback can be used to modify the PBM configuration datastore 312, the master content datastore 314, to generate alerts for action by human or artificial agents, or for some other applicable purpose.

In the example of FIG. 3, the PBM 318 is coupled to the PBM configuration datastore 312, the master content datastore 314, and the slave feedback datastore 316. In a specific implementation, the PBM 318 transmits data intended for receipt by enterprise WLAN-coupled PBSs 306. The PBM 318 may or may not also act as a PBT (see, e.g., FIG. 2, network device-coupled PBT 206), either by transmitting proximity beacons that can be picked up by PBSs or PBRs, or by alternating between transmissions intended for receipt by PBSs and transmissions intended for receipt by PBRs. In an implementation in which the transmissions of the PBM 318 are proximity beacons, the PBSs can be characterized as repeaters that serve to extend the range of the proximity beacons if the proximity beacons are forwarded by the PBSs to PBRs. In an implementation in which the transmissions of the PBM 318 are different for PBSs and PBRs, transmissions for the PBSs can be characterized as control frames, data frames, or a combination thereof that control the PBSs or provide data for use in proximity beacons transmitted by the PBS and transmissions for the PBRs can be characterized as proximity beacons.

In the example of FIG. 3, the enterprise WLAN 304 couples the network device-coupled PBM 302 to PBSs via a wireless connection. In a specific implementation, the enterprise WLAN 304 includes a Wi-Fi network; the PBM 302 is operationally connected to the PBSs via the Wi-Fi network. In an alternative, the PBM 302 is operationally connected to the PBSs via some other wireless technology (e.g., WiMAX and other standards in the IEEE 802.16 family, LTE and other standards in the 3GPP family, UMTS, etc.). In an implementation in which the PBM 318 transmits proximity beacons, the WLAN 304 will necessarily include, in whole or in part, a wireless PAN appropriate for transmitting proximity beacons (e.g., BLE, ZigBee, Z-Wave, active RFID, etc.). In an alternative, the enterprise WLAN 304 could be replaced with one or more wired connections between the network device-coupled PBM 302 and a subset of PBSs to which the network device-coupled PBM 302 is operationally connected.

In the example of FIG. 3, the enterprise WLAN-coupled PBSs 306 include PBS configuration datastores 320, slave content datastores 322 and PBSs 324. In a specific implementation, the enterprise WLAN-coupled PBSs 306 are operationally connected to the network device-coupled PBM 302 through the enterprise WLAN 304.

The PBS configuration datastores 320 are intended to represent parameters associated with the operation of the PBSs 324. For example, the parameters can include transmit power, transmit frequency, and the like. A parameter can be provided from the network device-coupled PBM 302 and/or an enterprise network device (see e.g. the network device 204, FIG. 2). A parameter may or may not initially be provided from a device other than the enterprise network device via a remote connection (e.g. from the Internet). A parameter can also be provided to the PBS configuration datastores 320 prior to coupling the enterprise WLAN-coupled PBSs 306 to the enterprise LAN 304 (e.g., in the factory, at retail, or at some other time prior to installation). A first subset of the parameters can be provided from a first source and a second subset of the parameters can be provided from a second source.

The slave content datastores 322 are intended to represent primary beacon values associated with transmissions from the PBSs 324 and/or repeaters or intermediate nodes between the PBSs 324 and PBR devices 310. For example, the primary beacon values can include a UUID, major, and minor value for transmission by the PBSs 324. The primary beacon values of a first and second of the enterprise WLAN-coupled PBSs 304 need not be the same. For example, each of the beacons could have the same UUID and major, but different locally, potentially enterprise-wide, and perhaps universally unique minor values. Alternatively, the primary beacon values could be identical for one or more enterprise WLAN-coupled PBSs 306. Secondary beacon values can be associated with battery life or other value determined to be useful for transmission, but not necessary for the purpose of beaconing a location. Secondary beacon values can be considered to be part of the PBS configuration datastores 320, the slave content datastores 322, some other datastore, or a combination thereof.

In a specific implementation, the primary beacon values stored in the slave content datastores 322 are determined prior to deployment as default values. The default values can be set at the time of manufacture, purchase, or by an admin prior to coupling the enterprise WLAN-coupled PBSs 306 to the enterprise WLAN 304. Instead or in addition, one or more of the primary beacon values can be modified as part of an initialization process when the enterprise WLAN-coupled PBSs 306 are coupled to the network device-coupled PBM 302 or as an update in response to some stimulus, such as an administrator determining the primary beacon values should be changed and pushing the modification to the enterprise WLAN-coupled PBSs 306 from a proximity beacon management system (see, e.g., FIG. 1, the proximity beacon management system 110), which may be implemented on a network device of the enterprise network (see, e.g., network device 204, FIG. 2) or some other device coupled to the enterprise LAN and/or through an interface on the enterprise WLAN-coupled PBSs 306. The initialization or update of the primary beacon values can be accomplished manually or via an automated process, such as by pushing primary beacon values from a network device (which in this example would include a slave content datastore that exists for at least a short time) when the coupling of the enterprise WLAN-coupled PBSs 306 are detected and recognized.

In the example of FIG. 3, the enterprise PANs 308 are intended to represent the transmission of proximity beacons from the enterprise WLAN-coupled PBSs 306 into an airspace. The enterprise PANs 308 can be considered distinct from one another, or the enterprise WLAN-coupled PBSs 306 can be configured to transmit a unified PAN. It should be understood a unified PAN can result in a larger wireless network, much as an extended service area (ESA) of a Wi-Fi network offers a larger network than a basic service area (BSA), but that a frequent goal of PANs in a proximity beacon context is to have a relatively small PAN to more precisely estimate relative proximity to the relevant beaconing device. Indeed, in some cases, it is desirable to keep transmission power of a proximity beacon device relatively low, thereby reducing transmission range, for the purpose of providing more precision when attempting to identify a location of a PBR relative to the relevant one of the PBSs 324 (in addition to reducing power consumption). Nevertheless, if an area is simply too large for a single PBS, and no distinction between sub-areas of the area is desired, creating an ESA comprising a plurality of PBSs 324 is possible. Unlike when ESAs are implemented in Wi-Fi networks, it is expected proximity beacon ESAs can be accomplished with relative ease by simply transmitting the same proximity beacon; the lack of a need to associate, authenticate, etc. reduces complexity.

In the example of FIG. 3, PBRs 310-1 to PBRs 310-n can collectively be referred to as PBRs 310. In a specific implementation, each of the PBRs 310 include a proximity beacon interpretation engine (not shown; see e.g. proximity beacon interpretation engines 226, FIG. 2). The PBRs 310 are coupled to the enterprise PANs 308. The "coupling" is intended to include the PBRs 310 detecting wireless signals (specifically, proximity beacons) transmitted by the PBSs 324. For illustrative purposes, the PBRs 310-1, for example, are coupled to the enterprise PAN 308-1, which means the PBRs 310-1, making use of a proximity beacon interpretation engine, can indicate proximity to the enterprise PAN 308-1. In a specific implementation, it is undesirable for the PBRs 310 to hear more than one of the enterprise PANs 308 at a time, and the transmitters of the PBSs 324 are set to a sufficiently low power level that there is minimal overlap between the enterprise PANs 308. This is not a problem for extended service area PANs. This is also not a problem if the location between a plurality of PANs is itself considered to be a relevant location. For example, a proximity beacon interpretation engine could interpret multiple proximity beacons and indicate (e.g. by displaying an arrow on the screen of a mobile device) the locations associated with multiple proximity beacons the PBR can detect and understand, potentially including analysis of a received signal strength indicator (RSSI) to determine distances.

Figure 4:
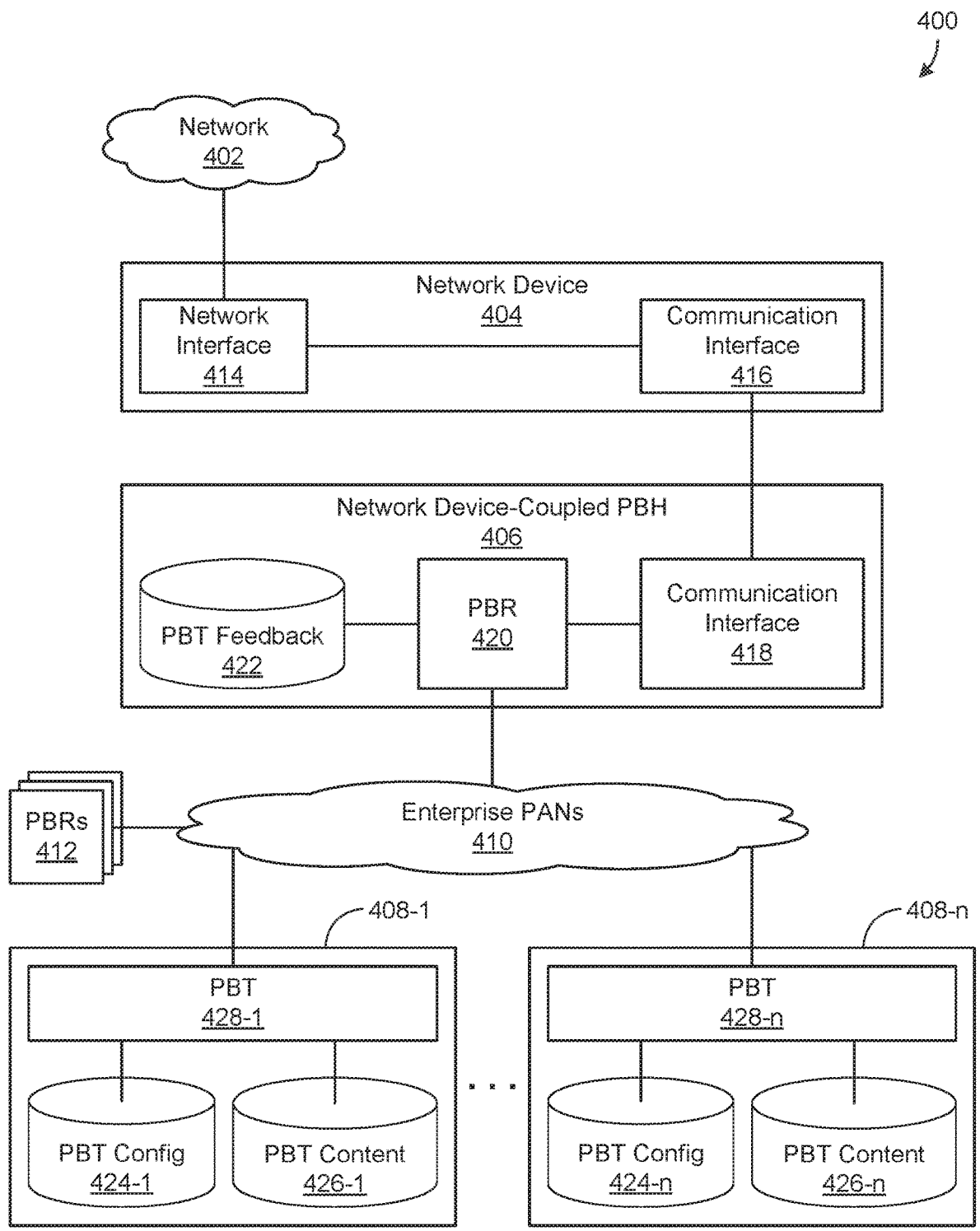
FIG. 4 depicts a diagram of an example of a system in which a proximity beacon hub (PBH) is operationally connected to a network device.

FIG. 4 depicts a diagram 400 of an example of a system in which a proximity beacon hub (PBH) is operationally connected to a network device. The diagram 400 includes a network 402, a network device 404, a network device-coupled PBH, PBT device 408-1 to PBT device 408-n (collectively, PBT devices 408), enterprise PANs 410, and PBRs 412.

The network 402 is intended to represent an enterprise network or an intermediate network to which the enterprise network is coupled. For example, the network 402 could be implemented as an enterprise LAN or as a packet switched telephone network (PSTN) coupled to an enterprise network.

In the example of FIG. 4, the network device 404 includes a network interface 414 and a communication interface 416. The network interface 414 is intended to represent one or more interfaces suitable for operationally connecting the network device 404 to the network 402. The communication interface 416 is intended to represent one or more interfaces suitable for operationally connecting the network device 404 to the network device-coupled PBH 406.

In the example of FIG. 4, the network device-coupled PBH 406 includes a communication interface 418, a PBR 420, and a PBT feedback datastore 422. The communication interface 418 is intended to represent one or more interfaces suitable for operationally connecting the network device-coupled PBH 406 to the network device 404, and is the counterpart to the communication interface 416. The PBR 420 is intended to represent a receiver configured to detect at least proximity beacons transmitted into the enterprise PANs 410. The PBT feedback datastore 422 is intended to represent a datastore configured to store primary proximity beacon values (or proximity beacon content), secondary proximity beacon values, or a combination thereof. In a specific implementation, the secondary proximity beacon values include presence-related data (e.g. a heartbeat), estimated battery life, RSSI, and/or other values associated with a subset of the PBT devices 408. The PBT feedback can be continuously or occasionally (e.g. in a batch) provided via the communication interface 418 or some other interface (not shown) to a proximity beacon management system (not shown).

In the example of FIG. 4, the PBT devices 408 include PBT configuration datastores 424-1 to 424-*n* (collectively, PBT configuration datastores 424), PBT content datastores 426-1 to 426-*n* (collectively, PBT content datastores 426), and PBTs 428-1 to 428-*n* (collectively, PBTs 428). The PBT configuration datastores 424 are intended to represent parameters associated with the operation of the PBTs 428. For example, the parameters can include transmit power, transmit frequency, and the like. A parameter can be provided to the PBT configuration datastores 424 prior to deployment (e.g., in the factory, at retail, or at some other time prior to deployment). A parameter can be provided via an applicable interface (not shown).

The PBT content datastores 426 are intended to represent primary beacon values associated with transmissions from the PBTs 428 and/or repeaters or intermediate nodes between the PBTs 428 and PBR devices 412. For example, the primary beacon values can include a UUID, major, and minor value for transmission by the PBTs 428. Secondary beacon values can be associated with battery life or other value determined to be useful for transmission, but not necessary for the purpose of advertising a location. Secondary beacon values can be considered to be part of the PBT configuration datastores 424, the PBT content datastores 426, some other datastore, or a combination thereof.

The PBTs 428 are intended to represent transmitters that advertise primary beacon values from the applicable PBT content datastores 426 in accordance with PBT configuration parameters from the applicable PBT configuration datastores 424.

In the example of FIG. 4, the enterprise PANs 410 are intended to represent proximity beacons from the PBTs 428. In a specific implementation, each of the PBTs 428 is associated with its own PAN of the PANs 410. Alternatively, a subset of the PBTs 428 can advertise the same proximity beacons, making a subset of the PANs 410 into an ESA. Alternatively, a subset of the PBTs 428 can have more than one PAN by advertising different proximity beacons at different times (alternately or in accordance with a detected PAN advertising stimulus).

In the example of FIG. 4, the PBRs 412 are intended to represent applicable PBRs coupled to the applicable PANs 410 and capable of detecting and deciphering the proximity beacons associated therewith. The PBR 420 is also coupled to the enterprise PANs 410 and has such a capability.

Figure 5:
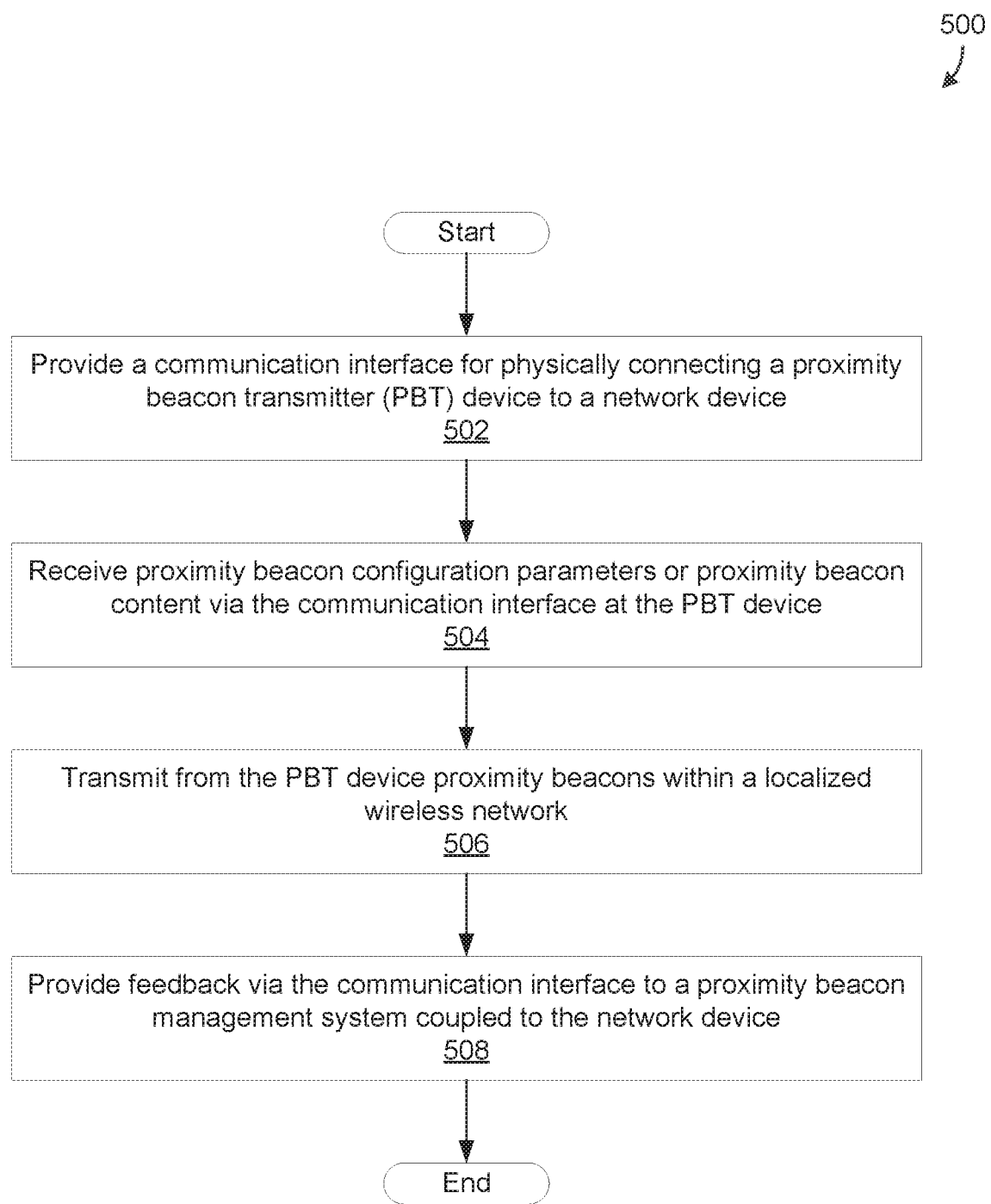
FIG. 5 depicts a flowchart of an example of a method for facilitating communications with a PBT.

FIG. 5 depicts a flowchart 500 of an example of a method for facilitating communications with a PBT. The flowchart 500 starts at module 502 with providing a communication interface for physically connecting a PBT device to a network device. In a specific implementation, the communication interface can provide (or enable) the physical connection with the network device. In one example, the communication interface is implemented in a USB device, such that the communication interface provides the physical connection by being plugged into a USB port of the network device. In another example, the communication interface is embedded within the network device, such that the communication interface provides the physical connection (e.g., in the form of an embedded connection) by being physically and electrically connected to at least some components within the network device. In a specific implementation, the network device is a wireless access point.

In the example of FIG. 5, the flowchart 500 continues to module 504 with receiving proximity beacon configuration parameters or proximity beacon content via the communication interface at the PBT device. In a specific implementation, the proximity beacon configuration parameters include a transmission power parameter. In a specific implementation, the proximity beacon content includes a UUID, major, and minor.

In the example of FIG. 5, the flowchart 500 continues to module 506 with transmitting from the PBT device proximity beacons within a localized wireless network. In a specific implementation, the localized wireless network is a PAN. The proximity beacons are detectable within the PAN by an appropriately configured PBR. For example, if the PBT device transmits proximity beacons in accordance with BLE, and a PBR is capable of detecting proximity beacons transmitted in accordance with BLE, as well as determining the proximity beacons are in fact proximity beacons, the PBR would be considered appropriately configured. It is expected the proximity beacon contents will have values associated with a context defined by the enterprise responsible for their transmission, but the PBR devices that hear the proximity beacons must have the ability to figure out what that context is, which can include downloading data sufficient to interpret the proximity beacon contents as intended by the enterprise.

In the example of FIG. 5, the flowchart 500 continues to module 508 with providing feedback via the communication interface to a proximity beacon management system coupled to the network device. In a specific implementation, the feedback is provided via the physical connection. Alternatively or in addition, feedback can be provided from the PBT device to the proximity beacon management system via a wireless interface. Alternatively or in addition, feedback can be provided from the network device in response to the physical connection between the network device and the PBT device being broken.

Figure 6:
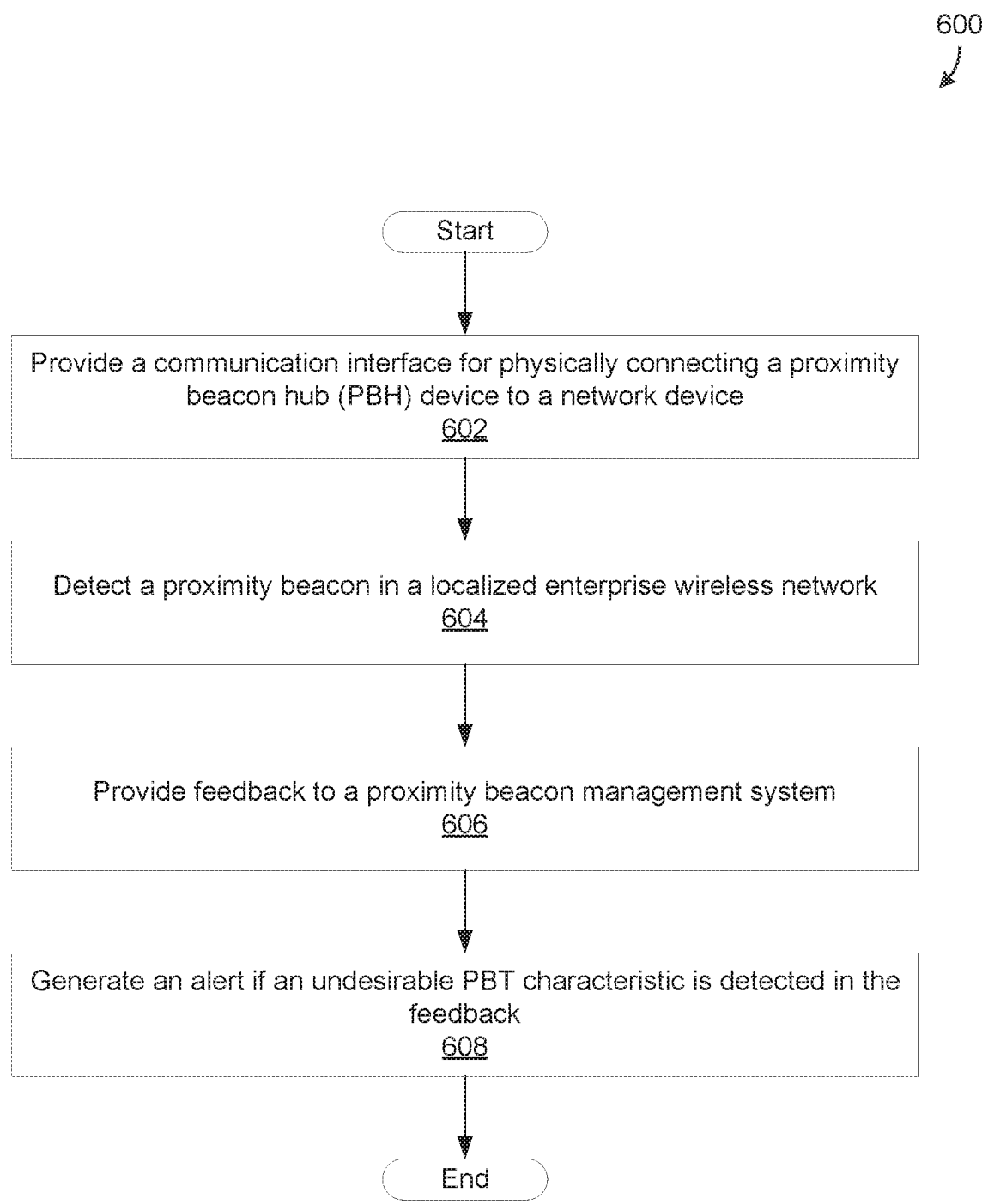
FIG. 6 depicts a flowchart of an example of a method for facilitating communications with a PBH.

FIG. 6 depicts a flowchart 600 of an example of a method for facilitating communications with a PBH. The flowchart 600 starts at module 602 with providing a communication interface for physically connecting a proximity beacon hub (PBH) device to a network device. In a specific implementation, the communication interface can provide (or enable) the physical connection with the network device. In one example, the communication interface is implemented in a USB device, such that the communication interface provides the physical connection by being plugged into a USB port of the network device. In another example, the communication interface is embedded within the network device, such that the communication interface provides the physical connection (e.g., in the form of an embedded connection) by being physically and electrically connected to at least some components within the network device. In a specific implementation, the network device is a wireless access point.

In the example of FIG. 6, the flowchart 600 continues to module 604 with detecting a proximity beacon in a localized enterprise wireless network. In a specific implementation, the localized enterprise wireless network is a PAN created by PBTs deployed by the enterprise or an agent thereof. In a specific implementation, the proximity beacon includes secondary proximity beacon data useful for determining operating characteristics of the PBTs, such as presence, transmission power, battery life, and/or other operating characteristics.

In the example of FIG. 6, the flowchart 600 continues to module 606 with providing feedback to a proximity beacon management system. In a specific implementation, the feedback at least includes a subset of the secondary proximity beacon data. The feedback can also include primary proximity beacon data, particularly if the deployed PBTs can have their associated proximity beacon content modified via an admin if the proximity beacon content is not a desired proximity beacon content.

In the example of FIG. 6, the flowchart 600 continues to module 608 with generating an alert if an undesirable PBT characteristic is detected in the feedback. An undesirable PBT characteristic can include no detected proximity beacon for a period of time (e.g. no heartbeat detected), improper transmission power, low battery life, undesirable proximity beacon values, or some other stimulus. The alert can be used to inform an admin of a problem with a PBT so the admin can remedy the problem by replacing a battery, replacing a PBT, reconfiguring a PBT, or the like.

Figure 7:
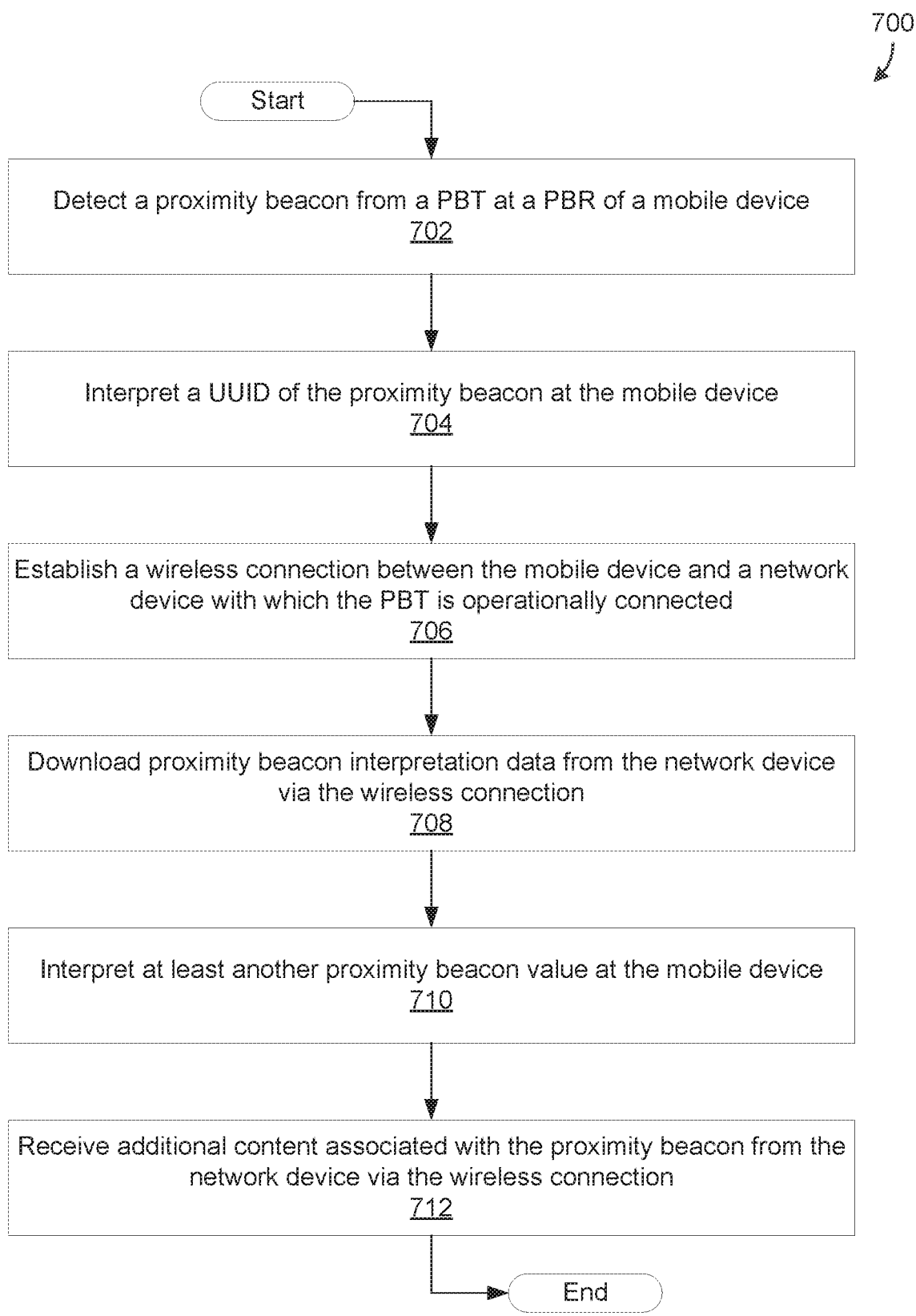
FIG. 7 depicts a flowchart of an example of a method for providing content associated with a proximity beacon.

FIG. 7 depicts a flowchart 700 of an example of a method for providing content associated with a proximity beacon. In the example of FIG. 7, the flowchart 700 starts at module 702 with detecting a proximity beacon from a PBT at a PBR of a mobile device. This example is intended to illustrate a use case in which a visitor or customer of an enterprise has a mobile device capable of detecting proximity beacons transmitted by a PBT of the enterprise. The PBT can be implemented as a network device-coupled PBT (see e.g. network device-coupled PBT 206, FIG. 2), a PBM or PBS (see e.g. network device-coupled PBM 302, FIG. 3; PBS devices 306, FIG. 3), or a PBT deployed near a network device-coupled PBH (see e.g. PBT devices 408, FIG. 4).

In the example of FIG. 7, the flowchart 700 continues to module 704 with interpreting a UUID of the proximity beacon at the mobile device. This example is intended to illustrate a use case in which the mobile device can interpret a UUID, such as by making use of a proximity beacon interpretation engine (see e.g. proximity beacon interpretation engines 226, FIG. 2). In a specific implementation, the mobile device is capable of using either from an extant datastore on the mobile device or by connecting to a network (including, potentially, a network of the enterprise) to download data to update a datastore on the mobile device, data sufficient to interpret the UUID. In an expected use case, interpretation of the UUID should identify the enterprise or a portion thereof. A UUID is a convenient way to refer to a value that is intended to identify the enterprise in the manner described, but an applicable other terminology (e.g. ID) could be used.

In the example of FIG. 7, the flowchart 700 continues to module 706 with establishing a wireless connection between the mobile device and a network device with which the PBT is operationally connected. It may be noted this step is optional in the sense that the mobile device may be capable of obtaining all data desired from other sources (e.g. via a cellular connection with a base station that is not part of the enterprise network). It may also be the case that a user of the mobile device will not want to establish a wireless connection with the enterprise's network and will choose to obtain desired data via other means.

In the example of FIG. 7, the flowchart 700 continues to module 708 with downloading proximity beacon interpretation data from the network device via the wireless connection. Of course, if the mobile device does not have a wireless connection with the enterprise's network device, the data will have to be downloaded via other means if the relevant data is not on the mobile device already. However, WLAN connections of the type an enterprise can offer are often convenient because they generally consume less power than cellular connections, are generally faster, and are generally free of charge. Moreover, the enterprise might be able to reliably keep proximity beacon interpretation data up-to-date, at least relative to a source outside the enterprise.

In the example of FIG. 7, the flowchart 700 continues to module 710 with interpreting at least another proximity beacon value at the mobile device. The "at least another proximity beacon value" can include, for example, a major value. In a specific implementation, the identifier of the proximity beacon can include a major value. In some cases, the major value can be associated with at least one of a store, a department, an organization, specified premises, or a specified geolocational area.

Depending upon configuration-specific factors and preferences, the flowchart may or may not return (not shown) to module 708 to download additional data, such as data associated with a minor value if a user of the mobile device indicates such data is desired. In a specific implementation, the identifier of the proximity beacon can include a minor value. In some instances, the minor value can be associated with at least one of a merchandise, a product, or a service.

In the example of FIG. 7, the flowchart 700 ends at module 712 with receiving additional content associated with the proximity beacon from the network device via the wireless connection. Examples of additional content can be coupons for items proximate to the PBT advertising its location, information about the location (e.g. information about an artist when standing near an exhibit of the artist's) or a plethora of other options the enterprise wants the user of the mobile device to access. The user of the mobile device may also be given choices about what data they would like to receive, by requesting additional detail or branching to another data drill-down. If the identity of the user (or geographic, demographic, psychographic, or other data about the user) is known, the additional content can be further fine-tuned as the enterprise or an agent thereof deems most appropriate.

These and other examples provided in this paper are intended to illustrate but not necessarily to limit the described embodiments and implementations. As used herein, the terms "embodiment" and "implementation" mean an embodiment or implementation that serves to illustrate by way of example but not limitation. The techniques described in the preceding text and figures can be mixed and matched as circumstances demand to produce alternative embodiments or implementations.

We claim:

1. A system, comprising:
a first device comprising a first communication interface and a second communication interface, the first device being coupled to a network via the first communication interface; and
a second device coupled to the first device via the second communication interface, the second device including a proximity beacon transmitter (PBT) configuration datastore storing PBT parameters, a beacon content datastore storing proximity beacon content, and a PBT,
wherein the PBT is configured to transmit proximity beacons comprising the proximity beacon content in accordance with the PBT parameters to form a personal area network (PAN) detectable by a proximity beacon receiver (PBR) device with a proximity beacon interpretation engine configured to interpret the proximity beacon content to indicate proximity to the first device, and wherein the first device is configured to establish a wireless connection with the PBR device and to provide additional content associated with the proximity beacons to the PBR device through the wireless connection, and wherein an operating state of the second device is based on the PBT parameters.

2. The system of claim 1, wherein the PBT is further configured to use power from the first device to transmit the proximity beacons.

3. The system of claim 1, wherein the second device is configured to provide feedback to an enterprise via the first device.

4. The system of claim 3, wherein the second device is further configured to provide the feedback in response to detecting a proximity beacon management stimulus.

5. The system of claim 1, further comprising a proximity beacon management system configured to provide PBT configuration values to the PBT configuration datastore, wherein the PBT configuration values cause the PBT to change from a first transmission power to a second transmission power.

6. The system of claim 1, wherein the PBT configuration datastore includes conditional configuration values, wherein the conditional configuration values cause the PBT to change from a first transmission power to a second transmission power in response to detecting a transmission power change stimulus.

7. A method, comprising:
receiving, at a first device, proximity information for transmitting a plurality of proximity beacons;
transmitting, by the first device, the plurality of proximity beacons to form a personal area network (PAN), the plurality of proximity beacons being detectable by a proximity beacon receiver (PBR) device with a proximity beacon interpretation engine configured to interpret the plurality of proximity beacons to indicate proximity of the PBR to a second device;
providing, by the first device, feedback to a proximity beacon management system coupled to the second device;
establishing a wireless connection between the second device and the PBR device; and
providing content associated with the plurality of proximity beacons to the PBR device through the wireless connection.

8. The method of claim 7, wherein the received proximity information comprises proximity beacon configuration parameters.

9. The method of claim 8, further comprising setting an operating state of the first device based on the proximity beacon configuration parameters.

10. The method of claim 9, wherein the proximity beacon configuration parameters comprise a transmit power or a transmit frequency for the plurality of proximity beacons.

11. The method of claim 7, wherein the received proximity information comprises proximity beacon content.

12. The method of claim 7, further comprising deriving, by the first device, power from the second device to transmit the plurality of proximity beacons.

13. The method of claim 7, wherein providing the feedback comprises providing the feedback to the proximity beacon management system in response to detecting a proximity beacon management stimulus.

14. A device, comprising:
a proximity beacon transmitter (PBT) configuration datastore that stores PBT parameters;
a beacon content datastore that stores proximity beacon content; and
a PBT configured to transmit proximity beacons comprising the proximity beacon content in accordance with the PBT parameters to form a personal area network (PAN) detectable by a proximity beacon receiver (PBR) device with a proximity beacon interpretation engine configured to interpret the proximity beacon content to indicate proximity to a second device coupled to the device,
wherein the second device is configured to establish a wireless connection with the PBR device in response to the interpretation by PBR of the proximity beacon content, and
wherein the device is configured to provide feedback to a proximity beacon management system coupled to the second device.

15. The device of claim 14, further comprising an interface for receiving the PBT parameters and the proximity beacon content.

16. The device of claim 14, wherein the device is configured to change an operating state of the PBT based on the PBT parameters.

17. The device of claim 16, wherein the PBT parameters comprise a transmit power or a transmit frequency for the proximity beacons.

18. The device of claim 14, further comprising an interface for deriving power from the second device to transmit the proximity beacons.

19. The device of claim 14, wherein the device is configured to provide the feedback to the proximity beacon management system in response to detecting a proximity beacon management stimulus.

* * * * *